(12) United States Patent
Kaluza et al.

(10) Patent No.: US 8,964,347 B2
(45) Date of Patent: Feb. 24, 2015

(54) DEVICE AND METHOD FOR CONTROLLING AN ELECTROMAGNETIC VALVE

(75) Inventors: Jan Kaluza, Boeblingen (DE); Horst Kleinknecht, Fichtenberg (DE)

(73) Assignee: Robert Bosch GmbH, Stuttgart (DE)

( * ) Notice: Subject to any disclaimer, the term of this patent is extended or adjusted under 35 U.S.C. 154(b) by 907 days.

(21) Appl. No.: 12/308,543

(22) PCT Filed: Nov. 23, 2007

(86) PCT No.: PCT/EP2007/062737
§ 371 (c)(1),
(2), (4) Date: Sep. 14, 2010

(87) PCT Pub. No.: WO2008/071533
PCT Pub. Date: Jun. 19, 2008

(65) Prior Publication Data
US 2011/0120559 A1      May 26, 2011

(30) Foreign Application Priority Data

Dec. 14, 2006   (DE) .......................... 10 2006 059 625

(51) Int. Cl.
*F02D 41/20*       (2006.01)
*F01N 3/20*        (2006.01)
*F01N 11/00*       (2006.01)

(52) U.S. Cl.
CPC ............... *F01N 3/206* (2013.01); *F01N 3/208* (2013.01); *F01N 11/005* (2013.01); *F02D 41/20* (2013.01); *F01N 2550/05* (2013.01); *F01N 2610/02* (2013.01); *F01N 2610/03* (2013.01); *F01N 2610/14* (2013.01); *F02D 2041/2051* (2013.01); *F02D 2041/2055* (2013.01); *F02D 2041/2058* (2013.01); *F02D 2041/2065* (2013.01); *Y02T 10/47* (2013.01); *Y02T 10/24* (2013.01)
USPC ......................................................... 361/140

(58) Field of Classification Search
CPC ......... F02D 41/20; H01F 7/18; H01F 7/1805; H01H 47/04
USPC ......................................................... 361/140
See application file for complete search history.

(56) References Cited

U.S. PATENT DOCUMENTS

| 4,636,620 | A  |   | 1/1987  | Wright et al. |
| 5,065,728 | A  | * | 11/1991 | Nakaniwa ...................... 123/683 |
| 6,014,956 | A  | * | 1/2000  | Cowden et al. ................ 123/446 |
| 6,059,067 | A  | * | 5/2000  | Shibahata et al. ............. 180/338 |
| 6,318,818 | B1 | * | 11/2001 | Brachert et al. ............ 303/119.2 |
| 7,059,460 | B2 | * | 6/2006  | Duan et al. .................. 192/70.12 |
| 7,314,370 | B2 | * | 1/2008  | Chian et al. ..................... 431/89 |

FOREIGN PATENT DOCUMENTS

| DE | 103 09 609  |   | 9/2003  |                |
| DE | 103 21 503  |   | 12/2004 |                |
| EP | 1 843 028   |   | 10/2007 |                |
| JP | 56019767    | * | 2/1981  | ................ B41J 3/04 |
| JP | 62-63148    |   | 3/1987  |                |
| JP | 5-77631     |   | 3/1993  |                |

(Continued)

*Primary Examiner* — Zeev V Kitov
(74) *Attorney, Agent, or Firm* — Kenyon & Kenyon LLP

(57) ABSTRACT

In a method for controlling an electromagnetic valve, the temperature of the valve is detected, and activation of and/or the current feed to the valve are performed as a function of the temperature of the valve.

7 Claims, 3 Drawing Sheets

(56) References Cited

FOREIGN PATENT DOCUMENTS

| | | |
|---|---|---|
| JP | 8-132914 | 5/1996 |
| JP | 9-246042 | 9/1997 |
| JP | 10-501865 | 2/1998 |
| JP | 11-351432 | 12/1999 |
| JP | 2001-182593 | 7/2001 |
| JP | 2003-113732 | 4/2003 |
| JP | 2003-328812 | * 11/2003 |
| JP | 2004-511715 | 4/2004 |
| JP | 2005-518988 | 6/2005 |
| JP | 2006-313823 | 11/2006 |
| WO | WO 02/33241 | 4/2002 |
| WO | WO 03/074338 | 9/2003 |

* cited by examiner

DEVICE AND METHOD FOR CONTROLLING AN ELECTROMAGNETIC VALVE

BACKGROUND OF THE INVENTION

1. Field of the Invention

The present invention relates to a method and a device for controlling an electromagnetic valve, in particular in a motor vehicle.

2. Description of Related Art

Electromagnetic valves are customarily used for dosing liquids, for example fuel and/or liquids used in connection with an exhaust gas aftertreatment, for example an aqueous urea solution. In particular when used in an exhaust gas aftertreatment system, these valves are exposed to a very high thermal load. This makes the exact metering of the liquid to be dosed more difficult, since the dosing quantity also changes when the temperature changes. If no diagnosis is provided, the state of the valve is unclear. Thus, the control unit normally has no information as to whether the valve is overloaded, is blocked, or if the quantity emitted corresponds to the desired quantity of liquid to be dosed. It is customarily provided that these conditions are estimated and this estimation is used to provide a corresponding control that counteracts these effects.

BRIEF SUMMARY OF THE INVENTION

The device according to the present invention makes reliable operation and diagnosis of an electromagnetic valve possible. In particular, the influence of temperature on the dosing may be taken into consideration and possible damage to the valve may be detected early and avoided. Furthermore, the movements of the valve, in particular the valve needle, may be determined and used for more exact control of the valve and accordingly exact dosing of the liquid. These advantages result from determining the valve's temperature, which is considered in the activation of and/or the current feed to the valve.

It is advantageous in particular if the current feed is temperature-optimized. This makes it possible to avoid an undesired or even unacceptable heating of the valve. In connection with the temperature-optimized current feed, it is provided that the current is fed in such a way that the heating of the valve is as low as possible. It is accepted that the dosing characteristics of the valve are worsened. In particular, the opening and closing of the valve may be delayed.

It is advantageous in particular if these changes caused by the temperature-optimized activation are reduced by a changed activation. Thus a delayed opening may be compensated by a longer current feed.

An analysis of the current flowing through the valve and the voltage present at the valve makes it possible to perform a simple resistance measurement and accordingly detect the temperature.

DETAILED DESCRIPTION OF THE INVENTION

Figure 1:
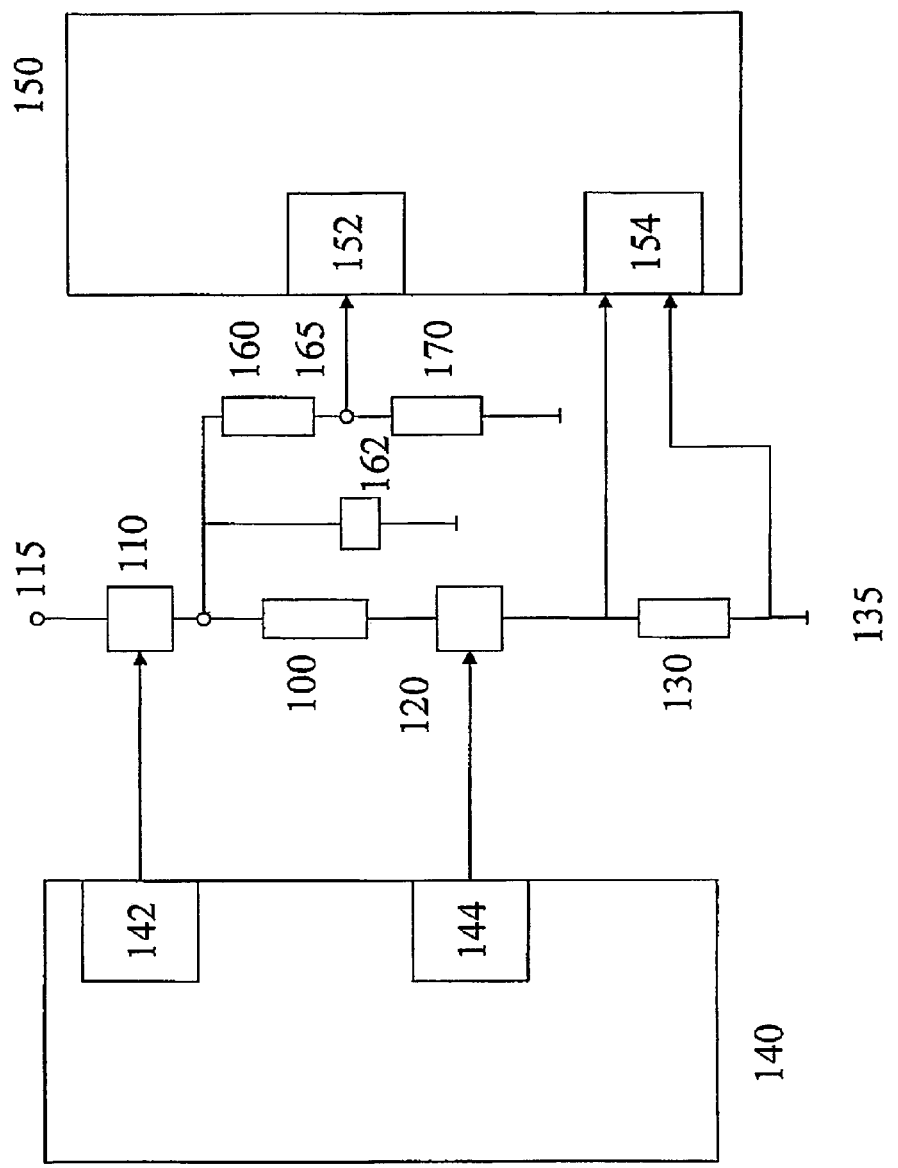
FIG. 1 shows a block diagram of the device according to the present invention.

The essential elements of a device for controlling an electromagnetic valve are shown in FIG. 1. The valve is denoted as 100. This valve is connected to a first terminal of a voltage supply 115 via first switching means 110, also described as a high-side switch. In addition, valve 100 is connected to a second terminal 135 of the voltage supply via second switching means 120, also described as a low-side switch, and current sensing means 130.

First switching means 110 are activated by a current controller 142 and the second switching means are activated by a metering controller 144. Current controller 142 and metering controller 144 are the principal elements of a controller 140. In principle, it may also be provided that the metering controller activates first switching means 110 and the current controller activates second switching means 120. In this case, the positioning of various additional elements, such as current sensing means 130 and freewheeling means and/or quenching means, must be altered.

At a connecting point between valve 100 and first switching means 110, a voltage divider, made up of a first resistor 160 and a second resistor 170, is connected to the second terminal of the supply voltage. Furthermore, this point is connected to the second terminal of the supply voltage via a freewheeling diode 162. Connecting point 165 supplies a signal to voltage detection 152.

In a simplified example embodiment, the voltage divider is eliminated and the voltage is picked off at terminal 115 of the voltage supply.

The two terminals of current sensing means 130, which is preferably designed as an ohmic resistor, reach a current detector 154. Voltage detector 152 and current detector 154 constitute the essential elements of an analyzer 150.

In the exemplary embodiment shown, the valve is activated via a high-side/low-side output stage. The current feed of the first switching means is for the purpose of current control and/or current regulation. This means that the current feed to first switching means 110 is selected in such a way that a specified current flows through the valve. The regulation of the current through the valve is determined, for example, by a changeable pulse-pause ratio of a pulse width modulated signal having a specific frequency.

This means that current controller 142 activates the first switching means in such a way that the desired current is fed to the valve. The current feed is essentially defined by the current values in the individual phases, in particular by the starting current between points in time T2 and T3 and/or the holding current in the holding phase between points in time T4 and T5. Furthermore, the current feed is defined by the current rises and current decays in the other phases.

Metering controller 144 activates the second switching means in such a way that the metering starts at a specific point in time and ends at a specific point in time and thus a specific amount of liquid is metered at a specific point in time. These points in time and this time duration of the metering are specified by a superordinate controller, as a function of the operating condition of the internal combustion engine or of the condition of an exhaust gas aftertreatment system. Metering controller 144 essentially controls the points in time at which the current feed begins and/or ends.

Analyzer circuit 150 detects and analyzes current I which flows through the valve and voltage U present at the valve. The current curve of a current feed during a metering cycle, i.e., a metering of liquid by means of the valve, is shown by way of example in FIG. 2. The current feed to the valve starts at point in time T0. This means that both the high-side switch and the low-side switch are closed. The current rises until point in time T2. At point in time T2, the current reaches a first current level that is also denoted as the starting current level. This current level is selected in such a way that the valve reliably moves to the new end position. At point in time T1, the valve reaches its new end position. The result of this is that the inductance of the valve changes and the current rise also changes accordingly. Based on this change in the inductance and the associated change in the rise of the current at constant voltage, this point in time T1 may be detected by analyzing the current curve. Until point in time T3, the current is guided through the first switching means in such a way that it remains at its activation level.

Between point in time T2 and T3, the coil is at saturation. In this region, the coil temperature is preferably calculated using Ohm's law based on the current flowing and the voltage applied. This requires that both the voltage present at the coil and the current flowing through the coil are known.

Between point in time T3 and T4, the current drops to the holding current of the coil. This value is selected in such a way that the valve stays in its position. This means that the valve is held open and the first switching means set the current in such a way that the current in turn remains nearly constant. Reducing the current from the holding current lowers the power loss at the valve and the valve is not overheated.

At point in time T5, the current feed ends, i.e. both switching means are opened and the current drops to the value of zero by point in time T6. Due to mechanical inertia, the valve needle still requires a certain time until it again reaches its original position. This point in time may again be detected by analyzing the current curve. This measurement is done in a manner similar to the determination of the switching time at point in time T1. After point in time T7, the current normally assumes the value of zero or another defined value. From this point in time, it is possible to compare the offset values and the series of measurements. The metering cycle ends after point in time T7.

Figure 3:
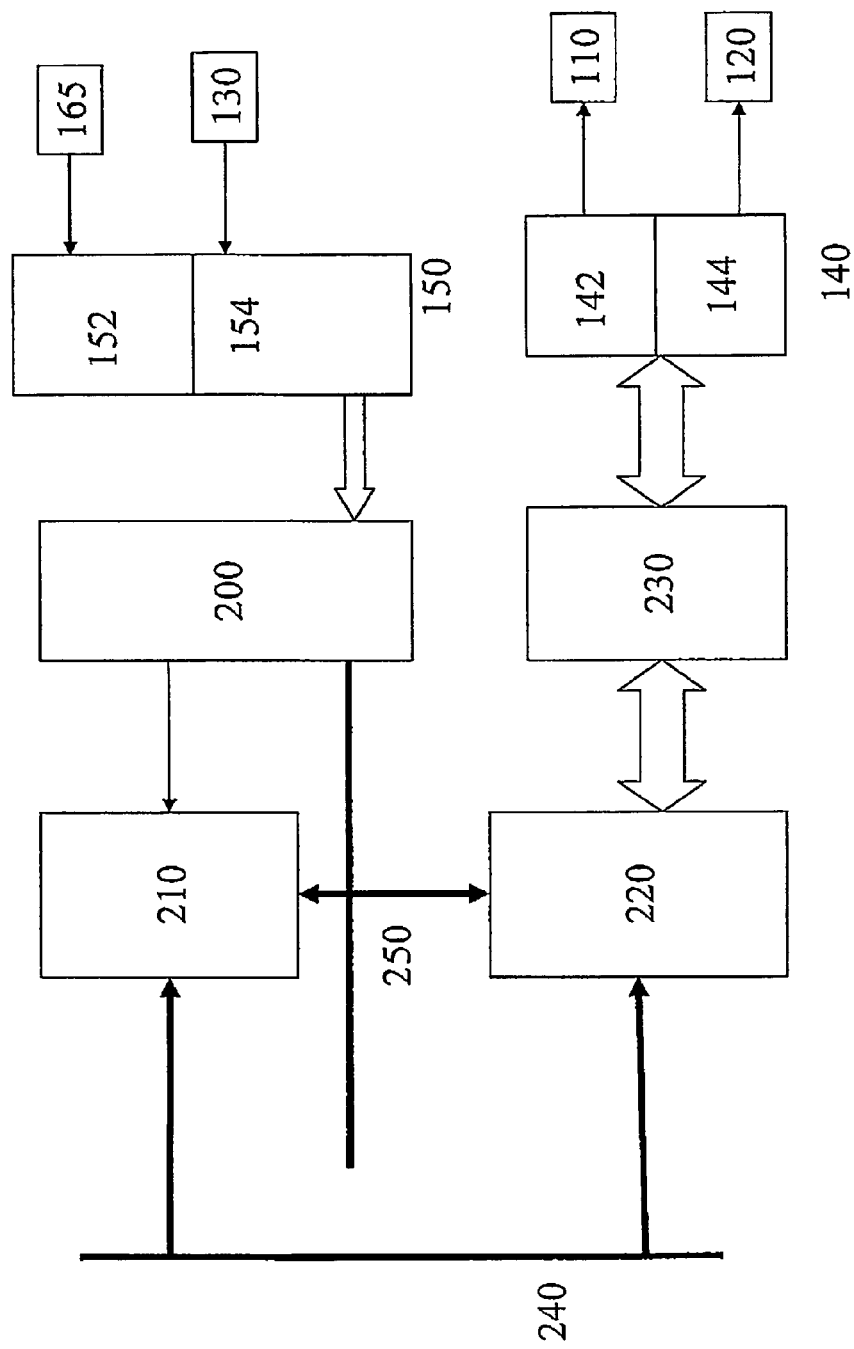
FIG. 3 shows a detailed representation of the device according to the present invention.

The control unit for the valve including controller 140 and analyzer 150 is shown in greater detail in FIG. 3. Elements already shown in FIG. 1 are denoted by corresponding reference symbols. The control unit shown may be implemented as a hardware unit or as a control method processed by a processor or as a mixture.

The voltage present at connecting point 165 and the voltage present at current sensing means 130 reach current detector 152 and voltage detector 154, respectively. The current detector and the voltage detector are preferably designed as A/D converters which convert the instantaneously present signals into a digital signal which corresponds to the particular voltage value and current value, respectively.

A DMA 200, which may also be described as a direct memory access, writes the current values and/or voltage values detected by current detector 154 and voltage detector 152, respectively, to a memory 210. It is preferably provided that DMA 200 is implemented as a program structure.

It is furthermore provided that first memory 210, the second memory and a computer (not shown) that processes the programs are integrated in the processor.

In order to exchange data, first memory 210, DMA 200 and a second memory 220 are connected to one another via a data bus 250. First memory 210 and second memory 220 are furthermore connected to an address bus 240. Second memory 220 exchanges signals with a state machine 230. State machine 230 in turn supplies corresponding signals to current controller 142 and metering controller 144.

The data stored in second memory 220 reach controller 140 via state machine 230, controller 140 correspondingly activating switching means 110 and 120.

A/D converters 152, 154 and DMA 200 may also be described as read-in means. State machine 230 and controller 140 may also be described as control means. DMA 200, state machine 230, analyzer 150 and controller 140 together make up an interface. These elements are preferably a component of a controller.

The incoming values with respect to voltage U, which is present at the valve, and/or current I, which flows through the valve, are converted by voltage detector 152 and current detector 154, respectively, from an analog signal into a digital signal by time triggering. The digitization is performed using analog/digital converters which constitute the essential elements of the current detection and the voltage detection. At specific points in time, i.e., time-triggered, DMA 200 writes the digitized signals to first memory 210. The signal curve of the voltage and/or the current over time or over the angular position is stored in memory 210. It may be provided that all values are stored over the entire metering cycle, i.e., from point in time T0 to clearly after point in time T7 in fixed intervals.

It is provided in one example embodiment that only individual measuring windows are defined, within which the measured values are read into first memory 210. This means the measured values are only read into the ranges that are of interest and whose curve characterizes the injection event. It is provided that the beginning and end of the measuring window are defined based on the expected point in time or angular position at which the event is estimated to occur. For example, it may thus be provided that a point in time which lies at a fixed value before the expected point in time is defined as the beginning of the measuring window. A point in time lying at a fixed time after the beginning is used as the end of the measuring window.

In another example embodiment, it may also be provided that only one or a plurality of values is stored for a specific period of time. It is thus adequate if only one value is stored in the period of time between T4 and T5. A plurality of values is stored in the period of time between point in time T0 and T2, so that point in time T1 at which the inductance of the coil changes may be reliably detected. Correspondingly, a plurality of values is also stored between points in time T6 and T7 in order to detect the closing of the valve by analyzing the current curve.

A suitable design or programming of DMA 200 makes it possible to adapt the device to any consumers, current curves, voltage curves, and hence applications. This results in a very flexible device which can thus also be used economically.

Based on these current values stored in first memory 210, the processor (not shown) calculates different characteristics that characterize the dosing of liquids using the solenoid valve. This means that the processor contains analyzer means that, based on the curve for the current and/or the voltage stored in first memory 210, perform a condition analysis and/or a curve analysis.

Thus the curve analysis determines, for example, the point in time at which the valve allows the liquid to flow and stops the flow of the liquid. These points in time are also described as opening point in time or BIP and as closing point in time or EIP. In addition to these points in time, additional characteristic points in time for the injection event may be determined from the current and/or voltage curve.

The condition analysis determines, for example, the resistance of the coil. This requires only that a current/voltage value is read in at the suitable point in time. Preferably, the temperature of the coil is determined from the resistance as a temperature variable. Furthermore, various current values and/or voltage values may be detected in order to check the proper function of the valve. Such an additional value is the so-called offset voltage and/or an offset current which may be read in at the end or shortly before the metering cycle. Furthermore, the value of the holding current may also be read in as an additional variable.

Based on these variables and additional variables which are not described in greater detail here, the processor calculates the variables characterizing the dosing. To this end, the processor includes analyzer means. The analyzer means analyze the results of the curve analysis and/or the condition analysis. If the determined values differ from the specified values, the processor corrects at least one of the control variables that characterize the activation.

Figure 2:
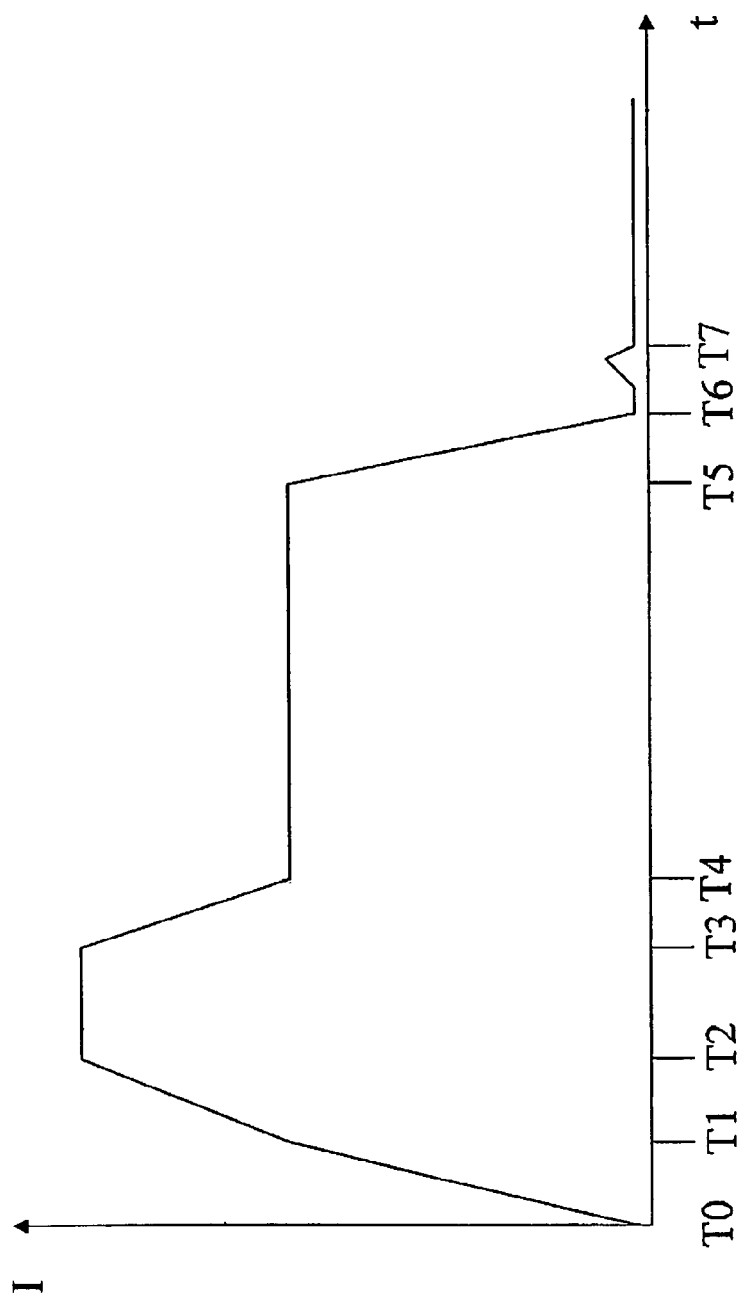
FIG. 2 shows the current flowing through the valve plotted over time.

In the case of the example shown in FIG. 2 having a high-side and a low-side switch, it is provided that one of the two switches is closed at the beginning of the metering cycle, i.e., at point in time T0, and reopened at point in time T5. The second switch is closed for a specific time at point in time T0, preferably until point in time T3, and is subsequently activated by a pulse width modulated signal which is defined by its pulse duty factor and its frequency. From point in time T6 until point in time T7, the first switch is closed briefly, making it possible to detect the closing point in time. The processor specifies the points in time from which the current feed is to begin and end as well as the pulse duty factor as control variables. Alternatively, the duration instead of the end may also be specified as a control variable. The processor stores these variables characterizing the dosing in second memory 220.

Based on these values stored in the second memory, state machine 230 calculates control variables to be applied to switching means 110 and 120. This is done, for example, in such a way that the state machine, based on the content of second memory 220, transfers a curve over time or over the angular position of the state of the two switching means to controller 140. Controller 140 then supplies corresponding activating signals to switching means 110 and 120. This state machine 230 and the controller are also described as control means and in a preferred embodiment are contained in the controller.

According to the present invention, the following procedure is provided. The output stage made up of at least one switching means is activated by a processor via an interface. In the specific embodiment described, two switching means are presented; however, only one switching means or even additional switching means may be provided. The interface contains at least one analog/digital converter as well as the DMA (direct memory access). This interface detects the voltage and/or the current and writes the curve of the voltage and/or the current in the first memory of the processor. Based on a desired activation curve for the valve, which is stored in the processor's second memory, the interface creates activation signals for the switching means. Independent of the type of output stage, the processor analyzes the signals and calculates the desired activation curve. The interface adapts the values supplied or needed by the processor to the signals which the output stage needs or supplies.

This means that the processor is wholly independent of the output stage used or the coil used. The same also applies to the reverse. The processor may be used to activate any consumer in any manner desired. The consumer and the processor and vice versa are adapted via the interface. The interface must be adapted to both. The interface contains only analog/digital converters and a small computational unit that takes over the function of the DMA or of the state machine.

Valves are frequently used for dosing liquid media into internal combustion engines. Since such valves are frequently used in the vicinity of the engine or hot components such as those used in the exhaust system, the thermal load on such components is very high. This thermal load is due on the one hand to the heating by the internal combustion engine or its assigned elements such as the exhaust system, or by heat buildup in the valve's coil due to the current feed to the valve. The heating causes the internal resistance of the coil to change on the one hand and, in an extreme case, damage or even destruction of the coil may occur. The change in the internal resistance of the coil also causes the dynamic characteristics of the valve to be changed, which in turn influences the dosing of the liquid.

In order to avoid this, it is now provided that the temperature of the valve is detected and the valve is activated or current is fed to it as a function of the temperature of the valve. In this connection, it is provided that in the static condition, i.e., in particular between points in time T2 and T3, the current is measured during the current feed. The voltage present at the valve is known in this condition or is also measured. Based on the current and the voltage, the internal resistance of the coil is then determined. Based on the internal resistance and the known internal resistance at room temperature, the temperature of the coil is determined. To this end, for example, a characteristics map may be provided in which the coil temperature is stored as a function of the internal resistance. Alternatively, it may be provided that the temperature is calculated based on the detected variables. The activation strategy of the valve is changed based on this stored temperature or directly on the determined internal resistance. On the one hand, the activation strategy is changed for the purpose of influencing the temperature; on the other hand, it is provided that the activation is changed in such a way as to compensate for the influences of the temperature on the characteristics of the valve.

In order to influence the temperature, it may, for example, be provided that the current feed is temperature-optimized. This is, for example, made possible in that a lower voltage or a smaller current rise is selected in the starting phase, i.e., until point in time T3. As a result, the temperature load of the valve is lower; in return the opening of the solenoid valve is slowed. The temperature is influenced by individual variables or a plurality of variables that determine the current feed.

The changed dynamic characteristics of the valve due to the higher temperature are compensated by a shortening and/or a prolongation of the activation. It is further provided that the influences on the dynamic characteristics based on the temperature-optimized current feed to the valve are also compensated by a change in the activation. This is in turn accomplished by prolonging and/or shortening the activation time accordingly.

According to the present invention, it is provided that the current feed is temperature-optimized in certain operating conditions, i.e., the current is fed in such a way that as little heat loss as possible occurs. It is provided in particular that such a temperature-optimized current feed occurs when it is detected that the temperature is higher than a threshold value or the internal resistance of the coil exceeds a specific value. This is advantageous in particular due to the fact that a temperature-optimized current feed normally results in a change in the switching times of the valve or in other variables influencing the dosed quantity, or the activation becomes less precise. For that reason, the temperature-optimized current feed preferably occurs only when it is necessary.

It is furthermore advantageous in particular that characteristic points in time and current values are detected during the current feed and are taken into consideration in the activation. For example, the point in time at which the valve opens and/or the point in time at which the valve closes are detected. These two points in time essentially determine the quantity of liquid dosed. The detection of these points in time makes it possible to determine the quantity actually metered. If the quantity or these characteristic values deviate from the specified values, the activation is corrected, i.e., metering controller 144 performs a corresponding correction, i.e., the metering is prolonged, shortened and/or shifted by a specific amount. Through this measure, changes of the valve based on the higher temperature or based on a temperature-optimized current feed are determined and corrected. This means that the points in time at which the valve opens and/or closes are determined based on the values for the current and/or the voltage. These points in time are then used for correcting the activation.

Overall, this means that the temperature is determined and taken into consideration for the activation, in particular by analyzing the current flowing through the valve and the voltage present at the valve, respectively. In doing so, the metering is changed in order to correct influences. This is preferably accomplished by metering controller 144 and by controlling second switching means 120. Furthermore, a temperature-optimized current feed is performed as a function of temperature. This is preferably accomplished by a corresponding control via current controller 142 by controlling first switching means 120.

What is claimed is:

1. A method for controlling an electromagnetic valve, comprising:
    determining the temperature of the valve; and
    controlling a temperature-optimized current feed to the valve, as a function of the determined temperature of the valve, in such a way heating of the valve is minimized;
    wherein a change in a switching time of the valve caused by the temperature-optimized current feed is compensated by a change in activation duration of the valve.

2. The method as recited in claim 1, further comprising:
    detecting at least one of (a) current flowing through the valve and (b) voltage drop across the valve.

3. The method as recited in claim 2, wherein the temperature is determined based on the at least one of the current and the voltage drop.

4. The method as recited in claim 2, wherein points in time at which the valve at least one of opens and closes are determined based on the at least one of the current flowing through the valve and the voltage drop across the valve.

5. The method as recited in claim 4, wherein the determined points in time are used for correcting an activation duration of the valve.

6. The method as recited in claim 1, wherein the temperature-optimized current feed is performed when at least one of the determined temperature and an internal resistance of the valve exceeds a predetermined threshold value.

7. A device for controlling an electromagnetic valve, comprising:
    an arrangement configured to determine the temperature of the valve; and
    an arrangement configured to control a temperature-optimized current feed to the valve, as a function of the determined temperature of the valve, in such a way heating of the valve is minimized;
    wherein a change in a switching time of the valve caused by the temperature-optimized current feed is compensated by a change in activation duration of the valve.

* * * * *